United States Patent [19]

Harandi et al.

[11] Patent Number: 4,971,681

[45] Date of Patent: Nov. 20, 1990

[54] METHOD AND APPARATUS FOR IMPROVED FCC SPENT CATALYST STRIPPING

[75] Inventors: Mohsen N. Harandi, Lawrenceville; Hartley Owen, Belle Mead; David A. Pappal, Haddonfield, all of N.J.; Paul H. Schipper, Wilmington, Del.

[73] Assignee: Mobil Oil Corp., Fairfax, Va.

[21] Appl. No.: 406,475

[22] Filed: Sep. 13, 1989

[51] Int. Cl.$^5$ .............................................. C10G 11/18
[52] U.S. Cl. .................................. 208/113; 208/150; 208/160; 208/164
[58] Field of Search ............... 208/113, 161, 159, 164, 208/150, 160

[56] References Cited

U.S. PATENT DOCUMENTS

| | | | |
|---|---|---|---|
| 4,043,899 | 8/1977 | Anderson et al. | 208/161 |
| 4,070,159 | 1/1978 | Myers et al. | 23/288 |
| 4,356,082 | 10/1982 | Gross | 208/164 |
| 4,411,773 | 10/1983 | Gross | 208/164 |
| 4,419,221 | 12/1983 | Castagnos et al. | 208/113 |
| 4,424,116 | 1/1984 | Hettinger, Jr. | 208/151 |
| 4,464,250 | 8/1984 | Myers et al. | 208/164 |
| 4,514,285 | 4/1985 | Niccum et al. | 208/161 |
| 4,574,044 | 3/1986 | Krug | 208/120 |
| 4,689,206 | 8/1987 | Owen et al. | 208/161 |
| 4,851,108 | 7/1989 | Bartholic et al. | 208/161 |
| 4,917,790 | 4/1990 | Owen | 208/113 |

*Primary Examiner*—Anthony McFarlane
*Attorney, Agent, or Firm*—Alexander J. McKillop; Charles J. Speciale; Robert B. Furr, Jr.

[57] ABSTRACT

A method and apparatus are disclosed to reduce the amount of unstripped hydrocarbon flowing to the regenerator in a riser reactor FCC unit. The catalyst stripper section is heated by indirect heat exchange with a mixture of hot regenerator flue gas and regenerated catalyst. In the preferred embodiment, the regenerator is operated under partial combustion conditions and the resulting carbon monoxide-containing flue gas is burned in a catalyst stripper heat exchanger.

9 Claims, 2 Drawing Sheets

METHOD AND APPARATUS FOR IMPROVED FCC SPENT CATALYST STRIPPING

BACKGROUND OF THE INVENTION

This invention relates to a method and apparatus for the separation of entrained cracked products from a fluidized finely divided solid catalyst in a fluidized catalytic cracking unit (FCC). More particularly, it relates to an improved method and apparatus for separating catalyst from a catalytically cracked product in a riser reactor fluid catalytic cracking catalyst stripping zone to minimize or substantially eliminate flow of valuable cracked product to the regenerator.

The field of fluid catalytic cracking had undergone significant improvements relating both to catalyst technology and to mechanical process unit design. These advances have enabled refiners to process heavier feedstocks as well as to increase the total yields of gasoline and distillate.

By way of background, the hydrocarbon conversion catalyst usually employed in an FCC unit is preferably a high activity crystalline zeolite catalyst of a fluidizable particle size. The catalyst is transferred in suspended or dispersed phase condition generally upwardly through one or more riser conversion zones (FCC cracking zones) providing a hydrocarbon residence time in each conversion zone in the range of 0.5 to about 10 seconds, and usually less than about 8 seconds. High temperature riser hydrocarbon conversions, occurring at temperatures of at least 1000° F. or higher and at 0.5 to 4 seconds hydrocarbon residence time in contact with the catalyst in the riser, are desirable for some operations before initiating separation of vapor phase hydrocarbon product materials from the catalyst. Rapid separation of catalyst from hydrocarbons discharged from a riser conversion zone is particularly desirable for restricting hydrocarbon conversion time. It is also highly desirable to strip hydrocarbon product materials from the catalyst before the catalyst enters a regeneration zone. During the hydrocarbon conversion step, carbonaceous deposits accumulate on the catalyst particles and the particles entrain hydrocarbon vapors upon removal from the hydrocarbon conversion step. The entrained hydrocarbons are removed from the catalyst in a separate catalyst stripping zone. Hydrocarbon conversion products separated from the catalyst and stripped materials are combined and passed to a product fractionation step. Stripped catalyst containing deactivating amounts of carbonaceous material, referred to as coke, is then passed to a catalyst regeneration operation.

Coke deposited on deactivated FCC catalyst together with entrained product which is carried over to the regenerator with the deactivated catalyst is referred to by those skilled in the art as "total delta carbon." For a given FCC unit design, at a fixed catalyst circulation rate, an increase in total delta carbon is accompanied by higher regenerator temperatures. Consequently, one method of limiting FCC regenerator temperature is to reduce total delta carbon by reducing carryover of cracked hydrocarbon product to the regenerator. Combustion of the valuable cracked product carried over to the regenerator not only decreases profitablility but also undesirably increases the concentration of atmospheric pollutants such as $NO_x$ in the regenerator flue gas.

Typical riser reactor fluid catalytic cracking processes mix cracking catalyst and oil feed at a ratio of about four to eight tons of catalyst per ton of oil feed. Given the substantially greater mass of the catalyst, it can well be seen that even a relatively minor improvement in catalyst stripping performance yields a valuable reduction in cracked products carryover to the regenerator.

Methods for separating catalyst particles from a gas suspension phase containing catalyst particles and hydrocarbon vapors, particularly the separation of high activity crystalline zeolite cracking catalysts, have been the subject of recent advances in the art.

Anderson et al. U.S. Pat. No. 4,043,899 discloses a method for rapid separation of a product suspension comprising fluidized catalyst particles and the vapor phase hydrocarbon product mixture, by discharging the entire suspension directly from the riser conversion zone into a cyclone separation zone. The cyclone is modified to include a separate cyclonic stripping of the catalyst separated from the hydrocarbon vapors. In the method of Anderson et al., the cyclone separator is modified to include an additional downwardly extending section comprising a lower cyclone stage. In this arrangement, catalyst separated from the gasiform material in the upper stage, slides along a downwardly sloping baffle to the lower cyclone where stripping steam is introduced to further separate entrained hydrocarbon products from the catalyst recovered from the upper cyclone. The steamed and stripped hydrocarbons are passed from the lower cyclone through a concentric pipe where they are combined with the hydrocarbon vapors separated in the upper cyclone. The separated and stripped catalyst is collected and passes from the cyclone separator by conventional means through a dipleg.

Myers et al. U.S. Pat. No. 4,070,159 provides a separation means whereby the bulk of catalyst solids is discharged directly into a settling chamber without passing through a cyclone separator. In this apparatus, the discharge end of the riser conversion zone is in open communication with the disengaging chamber such that the catalyst discharges from the riser in a vertical direction into the disengaging chamber which is otherwise essentially closed to the flow of gases. The cyclone separation system is in open communication with the riser conversion zone by means of a port located upstream from, but not near, the discharge end of the riser conversion zone. A deflector cone mounted directly above the terminus of the riser causes the catalyst to be directed in a downward path so as to prevent the catalyst from abrading the upper end of the disengaging vessel. The cyclone separator is of the usual configuration employed in a catalytic cracking unit to separate entrained catalyst particles from the cracked hydrocarbon products so that the catalyst passes through the dipleg of the cyclone to the body of the catalyst in the lower section of the disengaging vessel, and the vapor phase is directed from this vessel to a conventional fractionation unit. There is essentially no net flow of gases within the disengaging vessel beyond that resulting from a moderate amount of steam introduced to strip the catalyst residing in the bottom of the disengaging vessel. Further, the Myers et al. reference teaches a process in which hot spent catalyst is directly contacted with oxygen-containing gas withdrawn from the regenerator. The present invention, on the other hand, avoids such direct contact with its concomitant yield loss by flowing flue gas through a heat exchange conduit to indirectly heat the catalyst stripping zone.

It is also known to transfer thermal energy from the regenerator to the reactor. Gross U.S. Pat. Nos. 4,356,082 and 4,411,773 teach a fluid catalytic cracking (FCC) process and apparatus wherein the heat balance between the reactor and the regenerator of the FCC operation is partially uncoupled by transferring at least a portion of thermal energy from the reactor vessel riser to the regenerator vessel. The transfer of thermal energy results in a higher regenerating temperature. The thermal energy is recirculated to the upstream section of the reactor riser through a regenerated catalyst having higher temperature. As a result, the outlet of the reactor vessel is maintained at a substantially constant temperature (about 1000° F.) and the rate of conversion of the oil feed and the octane number of gasoline produced in the process are increased.

Krug U.S. Pat. No. 4,574,044 discloses a method for increasing the overall efficiency of an FCC process by decreasing the amount of valuable product burned in the regenerator. Separation of catalyst from hydrocarbon product is enhanced by first stripping the hydrocarbon product from the catalyst and then conditioning the catalyst in the presence of steam at elevated temperatures for a period of about ½ to 30 minutes. The benefits of this system include a reduction in coke make.

Owen et al. U.S. Pat. No. 4,689,206 teaches an apparatus for fluid catalytic cracking (FCC) of a hydrocarbon feed in an open or closed system, which includes a multi-stage stripper system, which comprises a means for spinning a gasiform mixture of catalyst and cracked hydrocarbons exiting from a riser, a first means for stripping the spun gasiform mixture, and a means for deflecting the gasiform mixture to separate catalyst from the cracked hydrocarbons.

Commonly-assigned U.S. patent application Ser. No. 903,365 filed Sept. 3, 1986, of Herbst et al discloses a technique for improving the efficiency of a catalyst stripper section by injecting an inert gas and heating the stripper section by carrying out an exothermic reaction within the stripper.

FCC regenerators with catalyst coolers are disclosed in U.S. Pat. Nos. 2,377,935; 2,386,491; 2,662,050; 2,492,948 and 4,374,750 inter alia.

SUMMARY OF THE INVENTION

It is an object of the present invention to provide a catalyst stripping process and apparatus which significantly reduces unstripped hydrocarbon flowing to the regenerator.

It is a further object of the present invention to improve the yield of valuable product by reducing or eliminating flow of cracked product to the regenerator.

It is a further object of this invention to reduce the partial pressure of water in the regenerator to reduce the degree of steam deactivation of the catalyst, thereby increasing catalyst life and reducing fresh catalyst makeup requirements.

It is a further object of this invention to reduce the emission of atmospheric pollutants and to reduce the catalytic cracking process air blower capacity requirements.

Briefly, the present invention improves stripping efficiency in a riser-reactor FCC catalyst stripper by indirectly heating the stripper section with hot regenerated catalyst fluidized in a stream of regenerator flue gas. The catalyst-containing flue gas stream leaves the cyclone separators located in the regenerator which are designed to allow at least a portion of the regenerated catalyst flow out of the regenerator entrained in the hot flue gas. Further, the regenerator is preferably operated under conditions for incomplete combustion, thus converting coke deposited on spent catalyst to a combustion gas mixture containing a substantial portion of carbon monoxide. When this preferred operating mode is employed, oxygen-containing gas is then mixed with the carbon monoxide-containing flue gas stream near the point at which the flue gas with entrained regenerated catalyst enters a heat exchange conduit positioned within the catalyst stripping zone.

More particularly, the method of the present invention achieves the above and other objects by the steps of: mixing a hydrocarbon feed with a regenerated catalyst in the lower section of the reactor riser of a riser-reactor fluid catalytic cracking unit; passing the mixture through the length of the reactor riser under conversion conditions whereby the hydrocarbon is catalytically cracked and the catalyst is deactivated; separating cracked product from deactivated catalyst; charging the deactivated catalyst to an annular stripping zone, said stripping zone preferably positioned around and concentric with a lower section of said reactor riser; withdrawing deactivated catalyst from the stripping zone; regenerating the withdrawn deactivated catalyst in a regeneration zone remote from and in valved communication with said reactor riser, whereby a hot flue gas containing entrained regenerated catalyst is evolved; withdrawing at least a portion of the flue gas containing entrained regenerated catalyst; and indirectly transferring at least a portion of the thermal energy of the regenerated catalyst and the hot flue gas to the stripping zone by flowing said hot flue gas containing entrained regenerated catalyst through a heat exchange conduit positioned within said stripping zone whereby the mixture of hot flue gas and regenerated catalyst is cooled and the stripping zone is heated.

The method may further include controlling conditions in the regenerator to favor partial combustion of coke deposited on the catalyst to carbon monoxide and mixing the resulting flue gas with oxygen-containing gas near the point at which the flue gas with entrained regenerated catalyst enters a heat exchange conduit positioned within the catalyst stripping zone. A platinum-containing compound or other combustion promoter may be contained within the heat exchange conduit or associated flue gas transfer lines to maximize heat transfer to the catalyst stripping zone. The combustion promoter may be added as a finely divided fluidizable solid immediately upstream from the heat exchange conduit.

The present invention achieves the above and other objects in an apparatus for separating entrained hydrocarbon vapors from a fluidized catalyst bed in a riser reactor fluid catalytic cracking unit catalyst stripper comprising a longitudinally extensive cylindrical reactor having inlet and outlet ports; a cylindrical riser extending longitudinally through said reactor; an oxidative catalyst regenerator having at least one cyclone separator for providing a mixture of hot flue gas and regenerated cracking catalyst; and heat exchange conduit extending through the reactor shell positioned within an annular space defined by said cylindrical reactor and said cylindrical riser for providing indirect heat exchange between the mixture of hot flue gas and regenerated cracking catalyst flowing through the heat exchange conduit and a fluidized mixture of cracking catalyst and cracked product within said stripper.

The apparatus may further comprise a multiple-tube heat exchanger positioned in the annular space between the outside surface of the riser conduit and the inside surface of the reactor shell.

The apparatus may still further comprise flow control means for controlling the hot flue gas flow rates through the heat exchange conduit to maintain a desired temperature in the catalyst stripper.

The present invention reduces total delta carbon in the regenerator by reducing the amount of valuable product carried over to the regenerator. This may lower regenerator temperature for a given catalyst circulation rate. By reducing hydrocarbons to the regenerator, the regeneration air requirement and the required regeneration air blower capacity is reduced. This is particularly beneficial in that the capacity of many modern fluid catalytic cracking process units is limited by available regeneration air blower capacity. Cooler regenerated catalyst further permits operation at an increased catalyst to oil ratio which increases conversion and enables the refiner to process heavier feedstocks.

DETAILED DESCRIPTION

Figure 1:
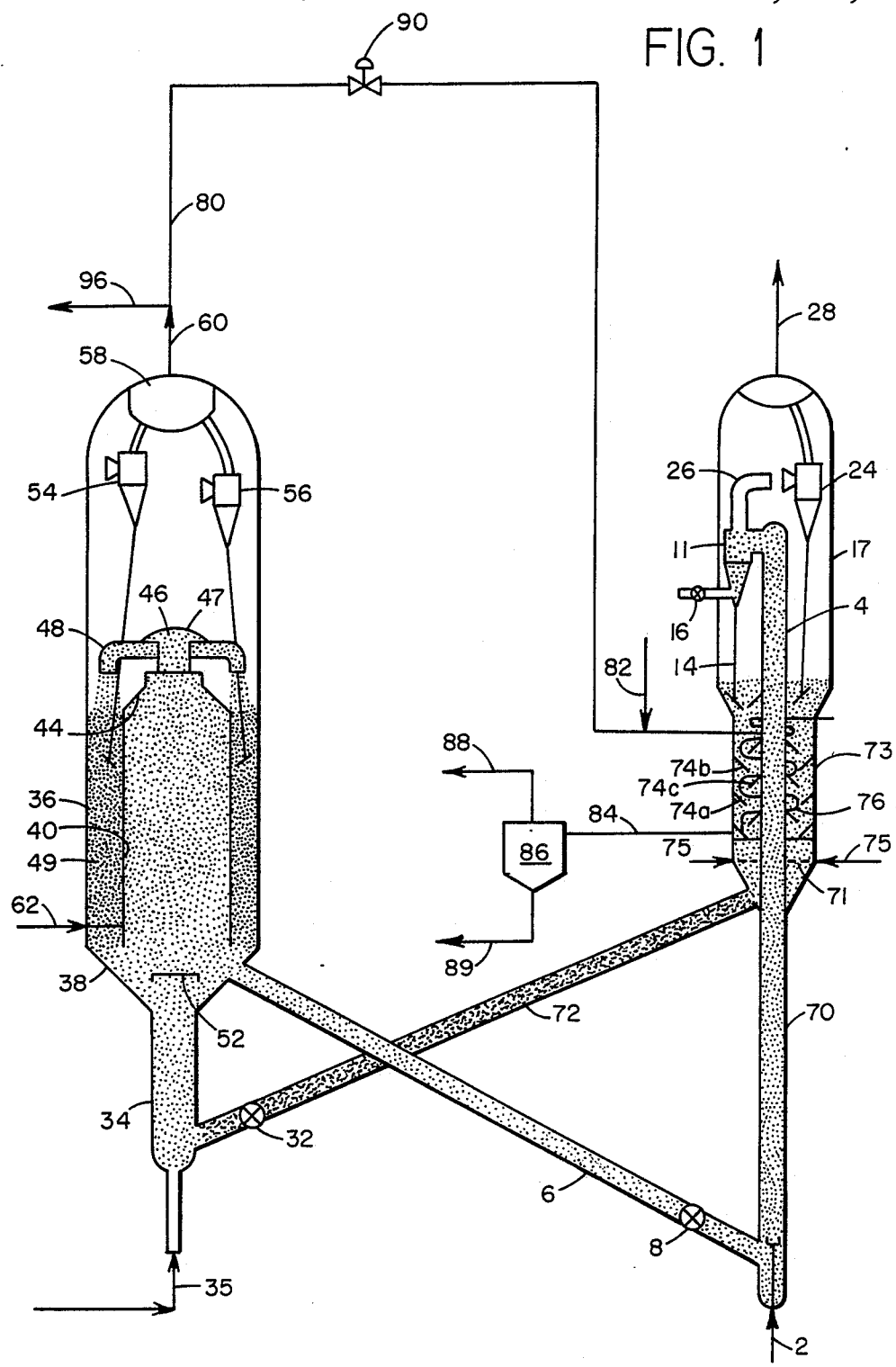
FIG. 1 is a simplified schematic diagram showing the major components of an FCC unit wherein regenerated catalyst containing flue gas provides thermal energy to heat the catalyst stripper section.

The riser-reactor fluid catalytic cracking process of the present invention provides enhanced separation between valuable product and spent cracking catalyst by raising the temperature of the spent catalyst stripping zone. The catalyst regenerator vessel is equipped with at least one cyclone separator which provides partial separation of regenerated catalyst from the regenerator flue gas. This separator design produces a flue gas stream containing entrained cracking catalyst which is believed to increase the heat transfer coefficient between the hot flue gas and the spent catalyst stripping zone as well as to enhance overall heat transfer by virtue of the greater mass of the flue gas stream containing entrained regenerated catalyst.

In a preferred embodiment of the invention, the catalyst regenerator operating conditions are ajusted to favor the formation of carbon monoxide as a component of the regenerator effluent flue gas. The carbon monoxide-containing flue gas is then mixed with oxygen-containing gas so that carbon monoxide reacts to form carbon dioxide within or upstream from the heat exchange conduit positioned within the catalyst stripping zone. The exothermic combustion of carbon monoxide to form carbon dioxide further contributes to the total heat available for raising the catalyst stripping zone temperature.

The major conventional cracking catalysts presently in use generally comprise a large pore crystalline silicate zeolite, generally in a suitable matrix component which may or may not itself possess catalytic activity. These zeolites typically possess an average crystallographic pore dimension of about 7.0 Angstroms and above for their major pore opening. Representative crystalline silicate zeolite cracking catalysts of this type include zeolite X (U.S. Pat. No. 2,882,244), zeolite Y (U.S. Pat. No. 3,130,007), zeolite ZK-5 (U.S. Pat. No. 3,247,195), zeolite ZK-4 (U.S. Pat. No. 3,314,752), merely to name a few, as well as naturally occurring zeolites such as chabazite, faujasite, mordenite, and the like. Also useful are the silicon-substituted zeolites described in U.S. Pat. No. 4,503,023. Zeolite Beta is yet another large pore crystalline silicate which can constitute a component of the mixed catalyst system utilized herein.

In general, the aluminosilicate zeolites are effectively employed herein. However, zeolites in which some other framework element which is present in partial or total substitution of aluminum can be advantageous. For example, such catalysts may provide a higher conversion of feed to aromatic components, the latter tending to increase the octane, and therefore the quality, of the gasoline produced in the process. Illustrative of elements which can be substituted for part or all of the framework aluminum are boron, gallium, titanium and any other trivalent metal which is heavier than aluminum. Specific examples of such catalysts include ZSM-5 and zeolite Beta containing boron, gallium and/or titanium. In lieu of, or in addition to, being incorporated into the zeolite framework, these and other catalytically active elements can also be deposited upon the zeolite by any suitable procedure, e.g., impregnation.

The catalytic cracking unit is preferably operated under fluidized flow conditions at a temperature within the range of from about 480° C. to about 740° C. (about 900° F. to about 1350° F.), more preferably about 540° C. (1000° F.), a catalyst to charge stock ratio of from about 2:1 to about 15:1 and a catalyst contact time of from about 0.1 to about 30 seconds. preferably 0.1 to 15 seconds, more preferably 0.5 to 4 seconds. Suitable charge stocks for cracking comprise the hydrocarbons generally and, in particular, petroleum fractions having an initial boiling point range of at least 200° C. (400° F.), a 50% point range of at least 260° C. (500° F.) and an end point range of at least 310° C. (600° F.). Such hydrocarbon fractions include gas oils, thermal oils, residual oils, cycle stocks, whole top crudes, tar sand oils, shale oils, synthetic fuels, heavy hydrocarbon fractions derived from the destructive hydrogenation of coal, tar, pitches, asphalts, hydrotreated feedstocks derived from any of the foregoing, and the like. As will be recognized, the distillation of higher boiling petroleum fractions above about 750° F. must be carried out under vacuum in order to avoid thermal cracking. The boiling temperature utilized herein are expressed in terms of convenience of the boiling point corrected to atmospheric pressure.

Referring to FIG. 1, a hydrocarbon oil feed such as gas oil or higher boiling material is introduced through a conduit 2 to the bottom or upstream section of a riser reactor 70. Hot regenerated catalyst is also introduced to the bottom section of the riser by a standpipe 6 equipped with a flow control valve 8. A vapor liquid suspension is formed in the lower bottom section of the riser 70 at an elevated temperature at about 525° C. to 620° C. (980° F. to 1150° F.) and is usually about 540° C. (1000° F.), depending on the degree of hydrocarbon conversion desired and on the composition of the feed. The suspension is formed in the bottom section of the riser and is passed upwardly through the riser under selected temperature and residence time conditions. Residence time of the catalyst in the riser is usually between 0.1 and 15 seconds, typically 0.5 to 4 seconds, before the suspension passes through suitable separating means, such as a series of cyclones 11 rapidly effecting separation of catalyst particles from vapor hydrocarbon conversion products. Thus, in the apparatus shown in FIG. 1, the suspension is discharged from the riser 70 into one or more cyclonic separators attached to the end of the riser and represented by a separator means 11. Catalyst particles separated in the cyclone 11 pass countercurrently in contact with stripping gas introduced by conduit 16 to a lower portion of the cyclone. The contacted and separated catalyst is withdrawn by a dipleg 14 for discharge into a bed of catalyst in the lower section of the reactor.

The end of the riser 70 with attached separation means 11 as shown in FIG. 1 is housed in the larger vessel 17 designated herein as a receiving and catalyst collecting vessel. The lower portion of the vessel 17 has generally a smaller diameter than the upper portion thereof and comprises a catalyst stripping section 73 to which a suitable stripping gas, such as steam, is introduced, e.g. by a conduit 75. The stripping section is provided with a plurality of frustoconical baffles 74A, 74B and 74C (only three are designated) over which the downflowing catalyst passes countercurrently to upflowing stripping gas.

Hot flue gas is withdrawn from plenum section 58 of regenerator vessel 36 through conduit 60. Control valve 90 positioned in line 80 sets the flowrate of hot flue gas flowing from the regenerator vessel 36 to the stripping section 73. The fluidized mixture flows through line 80 into heat exchange conduit 76 positioned inside the stripping section 73. While line 80 is illustrated as entering stripping section 73 near the top, it is to be understood that heat exchange conduit 76 may also be configured such that line 80 enters stripping section 73 near the bottom of the stripping zone. Heat exchange conduit 76 is illustrated as a single tube but may also comprise one or more substantially vertical or horizontal tubes. The heat exchange tubes may be arranged in vertical or horizontal banks connected in series or in parallel.

A regeneration gas is introduced into the bottom of regenerator riser 34 through a conduit 35. The regeneration gas may comprise air or may optionally comprise preheated air or oxygen supplemented air at about 150° C. to 260° C. (300° F. to 500° F.) and about 270 kPa (25 psig) to 450 kPa (50 psig), typically about 380 kPa (40 psig). The amount of lift gas introduced into the regenerator riser is sufficient for forming a suspension of catalyst in lift gas, which suspension is forced to move upwardly through riser 34 under incipient or partial regenerator conditions and into bottom portion of an enlarged regenerator vessel 36. Regenerator vessel 36 comprises a bottom closure member 38 shown in the drawing to be conical in shape. Other suitable shapes obvious to those skilled in the art may also be employed, such as rounded dish shapes.

The regenerator vessel 36 comprises a smaller diameter cylindrical vessel means 40 in the lower section provided with a cyclindrical bottom containing a cyclindrical opening, whose cross section is at least equal to the cross section of the riser 34. An annular space 49 is formed by the chambers 36 and 40 and serves to recirculate regenerated catalyst to the dense bed.

Vessel 40 is provided with a conical head member 46 terminating in a relatively short cylindrical section of sufficient vertical height capped at its upper end by means 47 to accommodate a plurality of radiating arm means 48. The radiating arms means 48 are opened on the bottom side and operate to discharge a concentrated stream of catalyst substantially separated from the combustion product gases generally downward into the space 49.

In the upper portion of vessel 36, a plurality of cyclonic separators 54 and 56 is provided for separating combustion flue gas from entrained catalyst particles. The separated flue gas passes into plenum 58 for withdrawal by a conduit 60. A controlled amount of flue gas is routed to the catalyst stripper section 73 through conduit 80 as described above. The balance of the flue gas is sent to a heat recovery section, e.g. steam generation, through conduit 96.

Cyclone separators 54 and 56 preferably provide imcomplete separation of regenerated catalyst from combustion products (flue gas) thereby flowing a mixture of regenerated catalyst and flue gas to plenum chamber 58.

The flue gas preferably contains a substantial amount of carbon monoxide produced by the oxidative regeneration of spent catalyst under oxygen-deficient conditions. This carbon monoxide may then be burned within the downstream stripping zone heat exchange conduit to heat the catalyst stripping zone.

A controlled amount of an oxygen-containing gas, for example, air, optionally flows through line 82 to mix with the carbon monoxide-containing flue gas flowing through line 80. The oxygen-containing gas is preferably preheated to a temperature of at least 150° C. (300° F.) before being mixed with the flue gas. The carbon monoxide contained in the flue gas then burns to carbon dioxide inside the heat exchange conduit 76 positioned in catalyst stripper section 73. A platinum-containing compound or other combustion promoter may be contained within the heat exchange conduit or associated flue gas transfer lines to maximize heat transfer to the catalyst stripping zone. The combustion promoter is preferably added as a finely divided fluidizable solid immediately upstream from the heat exchange conduit.

After passing through heat exchange conduit 76, the cooled mixture of flue gas and regenerated catalyst flows to separator 86 via line 84. Separator 86 is schematically illustrated as a cyclone separator but may also comprise filter means, for example a sintered metal filter. The purified flue gas flows out of separator 86 via line 88 to a heat recovery unit, for example a steam generator. Regenerated catalyst flows through line 89 to storage (not shown). The stored regenerated catalyst may then be fluidized and recycled to the cracking unit as needed.

The illustrated catalyst regenerator operation is designed to provide regenerated catalyst at an elevated temperature above 1050° F. and preferably at 1200° F. to 1400° F. having residual coke on catalyst of less than about 0.15 and typically in the range of 0.01 to 0.1 weight percent. However, the process of the present invention can be successfully used with any regenerator coupled to an FCC riser reactor. Accordingly, the regenerator operation illustrated in the embodiment of FIG. 1 is used as an example of one suitable regenerator and is not to be considered a limitation of the present invention.

Figure 2:
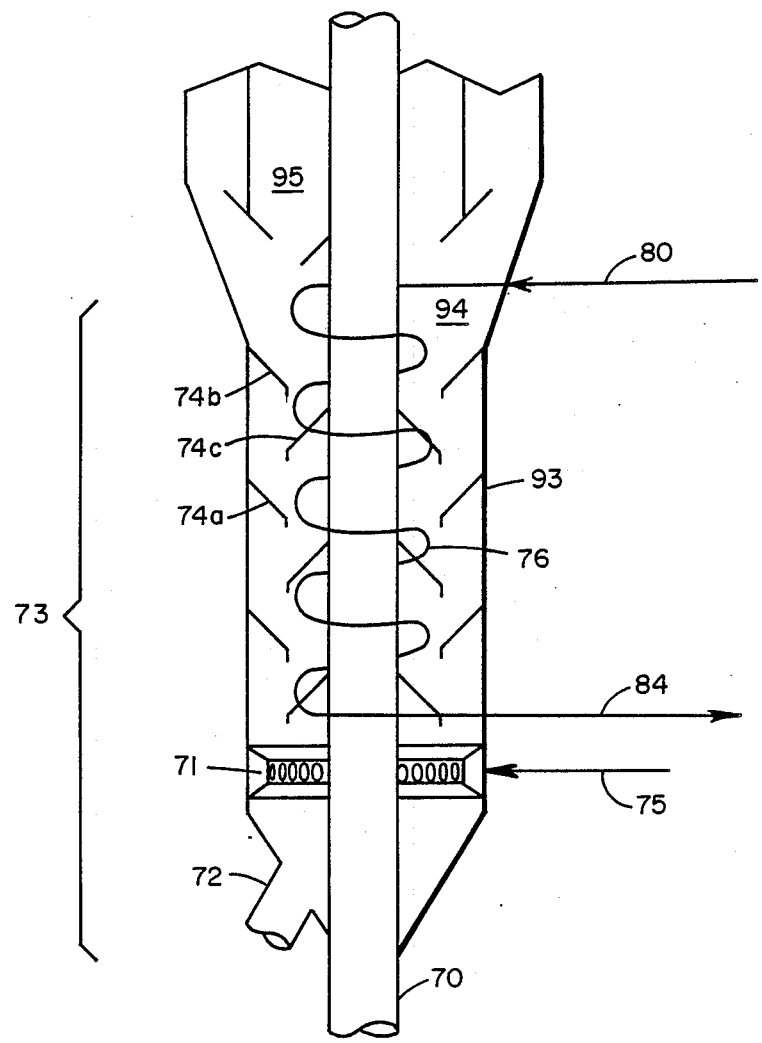
FIG. 2 is a simplified schematic diagram showing an FCC unit reactor riser and spent catalyst stripper including the novel catalyst stripper design of the present invention.

FIG. 2 details the catalyst stripper section of reactor vessel 17 shown in FIG. 1. The catalyst stripper section 73 comprises a cylindrical longitudinally extensive outer shell 93 having a plurality of frustoconical members 74A and 74B (only two are designated) attached to the inner surface thereof. Riser conduit 70 extends longitudinally through the stripper section and is equipped with a plurality of frustoconical members 74C (only one is designated) attached to its outside surface. A mixture of deactivated catalyst and entrained catalytically cracked product flows downward from a dense bed 95 to the inlet 94 of the catalyst stripper. Steam is introduced to the catalyst stripper near the bottom through conduit 75 and perforated steam distribution ring 71. Steam flows upward around the frustoconical baffles, stripping catalytically cracked product off the deactivated catalyst. The catalyst flows downward through the catalyst stripper and exits through valved standpipe 72.

Hot regenerated catalyst in a stream of flue gas enters the catalyst stripper through conduit 80. Conduit 80 may join a single heat exchanger conduit 76 which winds through the frustoconical baffles 74A, 74B and 74C. The cooled mixture of flue gas and regenerated catalyst leaves the heat exchanger conduit and flows to the regenerated catalyst standpipe 6 through conduit 81. In an alternate embodiment, not shown, conduit 80 may be joined with a plurality of vertical or horizontal tubes resembling a heat exchanger bank. The cooled mixture of flue gas and regenerated catalyst flowing out of the tubes is consolidated and similarly leaves the catalyst stripper through conduit 84.

Changes and modifications in the specifically described embodiments can be carried out without departing from the scope of the invention which is intended to be limited only by the scope of the appended claims.

What is claimed is:

1. A fluid catalytic cracking process comprising the steps of:
    (a) mixing a hydrocarbon feed with a cracking catalyst in the lower section of the reactor riser of a riser-reactor fluid catalytic cracking unit;
    (b) passing the mixture of step (a) through the length of said reactor riser under conversion conditions whereby said hydrocarbon is catalytically cracked and said catalyst is deactivated;
    (c) separating said cracked product and said deactivated catalyst;
    (d) charging said deactivated catalyst of step (c) to an annular stripping zone, said stripping zone positioned around and concentric with a lower section of said reactor riser;
    (e) withdrawing said deactivated catalyst from said stripping zone of step (d);
    (f) oxidatively regenerating said withdrawn deactivated catalyst of step (e) in a regeneration zone remote from and in valved communication with said reactor riser, at a temperature above that of said stripping zone under oxygen-deficient conditions to generate a flue gas containing carbon monoxide;
    (g) partially separating catalyst from said flue gas to evolve a hot flue gas stream containing entrained regenerated catalyst;
    (h) flowing said hot flue gas stream containing entrained regenerated catalyst to a heat exchange conduit positioned within said stripping zone of step (d) above; and
    (i) mixing said flue gas stream containing regenerated catalyst of step (h) above with oxygen-containing gas to exothermically convert carbon monoxide to carbon dioxide within said heat exchange conduit positioned within said stripping zone to indirectly transfer thermal energy from said closed heat exchange conduit to said stripping zone.

2. The process of claim 1 further comprising controlling the flowrate of oxygen-containing gas as well as the flowrate of hot flue gas containing entrained regenerated catalyst through said heat exchange conduit such that said stripping zone is heated to a temperature sufficient to enhance separation of catalyst and hydrocarbon product.

3. The process of claim 2 wherein said flowrates are controlled to increase the temperature of said stripping zone by at least 28° C. (50° F.).

4. The process of claim 1 wherein said cracking catalyst contains a zeolite having the structure of mordenite, zeolite X, zeolite Y, REY, USY, RE-USY or mixtures thereof.

5. The process of claim 4 wherein said cracking catalyst contains a zeolite having the structure of ZSM-5, ZSM-11, ZSM-22, ZSM-23, ZM-35, ZSM-48 or mixtures thereof.

6. The process of claim 1 further comprising adding a combustion promoter catalyst to said hot flue gas stream of step (h).

7. The process of claim 6 further comprising adding said combustion promoter catalyst to said hot flue gas stream of step (h) before said hot flue gas stream of step (h) enters said heat exchange conduit of step (i).

8. The process of claim 6 wherein said combustion promoter catalyst comprises platinum.

9. The process of claim 7 where in said combustion promoter catalyst comprises platinum.

* * * * *